(12) United States Patent
Neumann et al.

(10) Patent No.: US 9,745,953 B2
(45) Date of Patent: Aug. 29, 2017

(54) METHOD AND SYSTEM FOR REPLACING A SINGLE WIND TURBINE BLADE

(71) Applicant: General Electric Company, Schenectady, NY (US)

(72) Inventors: Ulrich Werner Neumann, Simpsonville, SC (US); Kevin Thomas Costain, Baltic, SD (US); Forrest Christopher Hach, Lake Benton, MN (US); Michael Royce Johnson, Campton, NH (US); Gaylon Mitchell Pfeiffer, Boston, MA (US); Rodney Robert Redd, II, Roaring Gap, NC (US); Stephanie Lohberg Willman, Greer, SC (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 14/697,054

(22) Filed: Apr. 27, 2015

(65) Prior Publication Data

US 2015/0226179 A1    Aug. 13, 2015

Related U.S. Application Data

(63) Continuation-in-part of application No. 13/658,359, filed on Oct. 23, 2012, now Pat. No. 9,027,243.

(51) Int. Cl.
*F03D 1/00* (2006.01)
*F03D 13/10* (2016.01)
*F03D 80/50* (2016.01)

(52) U.S. Cl.
CPC ............. *F03D 1/003* (2013.01); *F03D 13/10* (2016.05); *F03D 80/50* (2016.05);
(Continued)

(58) Field of Classification Search
CPC .......... F03D 1/001; F03D 1/003; F03D 1/0675
See application file for complete search history.

(56) References Cited

U.S. PATENT DOCUMENTS

| 742,447 | A | 10/1903 | Kidder |
| 2,654,638 | A | 10/1953 | Elliott |
| (Continued) | | | |

FOREIGN PATENT DOCUMENTS

| DE | 19741988 A1 | 4/1999 |
| DE | 10336392 A1 | 3/2005 |
| (Continued) | | |

OTHER PUBLICATIONS

Extended European Search Report for EP Application No. 10170277.7-1256, dated Jun. 14, 2012, pp. 1-4.
(Continued)

*Primary Examiner* — Jacob Cigna
(74) *Attorney, Agent, or Firm* — GE Global Patent Operation; Douglas D. Zhang (57) ABSTRACT

A method of replacing a wind turbine blade includes connecting a plurality of first hoisting devices between a wind turbine support hub and the wind turbine blade, suspending the wind turbine blade from the wind turbine support hub through the plurality of first hoisting devices, connecting a plurality of second hoisting devices between the wind turbine support hub and the wind turbine blade, supporting the wind turbine support blade with the plurality of second hoisting devices, disconnecting the plurality of first hoisting devices from the wind turbine blade, and lowering the wind turbine blade to the ground.

11 Claims, 15 Drawing Sheets

(52) U.S. Cl.
CPC ....... *F05B 2230/61* (2013.01); *F05B 2230/70* (2013.01); *F05B 2230/80* (2013.01); *Y02E 10/721* (2013.01); *Y02E 10/728* (2013.01); *Y10T 29/49318* (2015.01); *Y10T 29/53* (2015.01)

(56) References Cited

U.S. PATENT DOCUMENTS

| | | | |
|---|---|---|---|
| 2,782,436 A | 2/1957 | Tomer | |
| 2,873,089 A | 2/1959 | Porter | |
| 3,117,401 A | 1/1964 | Talley | |
| 3,504,767 A | 4/1970 | Sherman | |
| 3,520,383 A | 7/1970 | Loock | |
| 3,727,723 A | 4/1973 | Pitcairn et al. | |
| 4,008,785 A | 2/1977 | Mugnaini | |
| 4,286,417 A | 9/1981 | Shelton | |
| 5,226,973 A | 7/1993 | Chapman et al. | |
| 5,351,783 A | 10/1994 | Celli | |
| 5,685,393 A | 11/1997 | Early | |
| 5,743,969 A | 4/1998 | Lawler | |
| 6,079,517 A | 6/2000 | Payne | |
| 6,364,609 B1 | 4/2002 | Barnes | |
| 7,198,134 B2 | 4/2007 | Lemieux | |
| 7,207,777 B2 | 4/2007 | Bervang | |
| 7,360,310 B2 | 4/2008 | Bagepalli et al. | |
| 7,726,941 B2 | 6/2010 | Bervang | |
| 7,735,808 B2 | 6/2010 | Viladomiu I Guarro et al. | |
| 7,874,805 B2* | 1/2011 | Pedersen | B66C 3/00 416/204 R |
| D632,221 S | 2/2011 | Bogaert | |
| 7,927,445 B2 | 4/2011 | Zheng et al. | |
| 8,052,396 B2* | 11/2011 | Wobben | F03D 1/001 290/44 |
| 8,057,605 B2 | 11/2011 | Gallegos | |
| 8,651,462 B2* | 2/2014 | Van Berlo | B66C 23/18 254/278 |
| 8,743,196 B2 | 6/2014 | Fritz et al. | |
| 9,476,403 B2* | 10/2016 | Smith | B66C 1/108 |
| 9,500,090 B2* | 11/2016 | Hvid Nielsen | B66C 1/108 |
| 2006/0151767 A1 | 7/2006 | Wobben | F03D 1/001 254/334 |
| 2006/0175465 A1 | 8/2006 | Teichert | |
| 2006/0228220 A1* | 10/2006 | Wobben | F03D 1/001 416/244 R |
| 2007/0056801 A1 | 3/2007 | Iversen | |
| 2007/0151194 A1 | 7/2007 | Livingston et al. | |
| 2007/0290426 A1* | 12/2007 | Trede | F03D 1/001 269/1 |
| 2008/0105491 A1 | 5/2008 | Prout | |
| 2008/0203246 A1 | 8/2008 | Ingram et al. | |
| 2008/0307647 A1 | 12/2008 | Kessler | |
| 2010/0028152 A1 | 2/2010 | Numajiri et al. | |
| 2010/0132137 A1 | 6/2010 | Eggleston | |
| 2010/0139062 A1* | 6/2010 | Reed | F03D 1/001 29/23.51 |
| 2010/0225120 A1* | 9/2010 | Krogh | F03D 1/001 290/55 |
| 2010/0253086 A1* | 10/2010 | Song | F03D 1/001 290/55 |
| 2010/0254813 A1 | 10/2010 | Dawson et al. | |
| 2010/0290918 A1* | 11/2010 | Pedersen | B66C 3/00 416/245 R |
| 2010/0313417 A1* | 12/2010 | Lebon | F03D 1/001 29/888 |
| 2011/0042632 A1* | 2/2011 | Van Berlo | B66C 23/18 254/264 |
| 2011/0138937 A1 | 6/2011 | Fritz | |
| 2011/0173811 A1 | 7/2011 | Iversen | |
| 2012/0003089 A1 | 1/2012 | Byreddy et al. | |
| 2012/0073134 A1 | 3/2012 | Bywaters et al. | |
| 2012/0137481 A1* | 6/2012 | Lindberg | F03D 1/001 29/23.51 |
| 2012/0228881 A1* | 9/2012 | Siegfriedsen | F03D 1/001 290/55 |
| 2012/0328442 A1 | 12/2012 | Davis | |
| 2013/0074337 A1* | 3/2013 | Tan | B66C 23/207 29/889.1 |
| 2013/0236316 A1 | 9/2013 | Bitsch et al. | |
| 2013/0239491 A1 | 9/2013 | Tadayon | |
| 2013/0318789 A1 | 12/2013 | Gabeiras et al. | |
| 2014/0010658 A1* | 1/2014 | Nielsen | B66C 1/108 416/204 R |
| 2014/0010661 A1 | 1/2014 | Hancock | |
| 2014/0150227 A1 | 6/2014 | Teichert | |
| 2015/0300175 A1* | 10/2015 | Pfeiffer | F03D 1/001 29/889.1 |
| 2015/0300313 A1* | 10/2015 | Choi | F03D 1/003 29/889.1 |
| 2016/0040649 A1* | 2/2016 | Smith | B66C 1/108 415/121.3 |
| 2016/0146183 A1* | 5/2016 | Puls | F03D 1/003 29/889.1 |
| 2016/0327017 A1* | 11/2016 | Neumann | F03D 1/003 |

FOREIGN PATENT DOCUMENTS

| | | |
|---|---|---|
| EP | 1239150 A2 | 9/2002 |
| EP | 1886904 A2 | 2/2008 |
| GB | 2356355 A | 5/2001 |
| GB | 2459874 A | 11/2009 |
| JP | 1182285 A | 3/1999 |
| JP | 2004293455 A | 10/2004 |
| WO | 2006077358 A1 | 7/2006 |
| WO | 2008089763 A2 | 7/2008 |
| WO | 2009128708 A2 | 10/2009 |
| WO | 2011110254 A2 | 9/2011 |

OTHER PUBLICATIONS

N.A., "Self-Hoising Crane: Changing Gearbox, Generator, Rotor and Main Shaft", LIFTRA, Jan. 31, 2013, 1-5.

European Search Report and Opinion issued in connection with corresponding European Application No. 16166071.7 on Sep. 27, 2016.

* cited by examiner

METHOD AND SYSTEM FOR REPLACING A SINGLE WIND TURBINE BLADE

CROSS-REFERENCE TO RELATED APPLICATION

This application is a Continuation-in-Part of U.S. application Ser. No. 13/658,359 filed Oct. 23, 2012, the disclosure of which is incorporated by reference herein in its entirety.

BACKGROUND OF THE INVENTION

The subject matter disclosed herein relates to the art of wind turbines and, more particularly, to a method and system for replacing a wind turbine blade.

Wind generators convert energy provided by air currents into electricity. The air currents rotate large rotor blades or propellers that are mounted in nacelles at the top of a tower. The blades spin a rotor relative to a stator to generate an electrical current. The rate of rotation is controlled by varying blade pitch as well as through the use of various braking systems. During high wind conditions, the blade pitch is adjusted to spill wind energy in order to limit rotational speed. Occasionally, the braking system is employed to further prevent the blades from achieving high rotational speeds. During low wind conditions, the blade pitch is adjusted in order to capture as much wind energy as possible.

Over time, the wind generators require maintenance. Debris, hailstones and the like oftentimes impact the blades and cause damage. Replacing a worn or damaged blade generally requires the presence of one or more large ground or sea based cranes. The large cranes are used to retain and lower the blade to a surface such as the ground or a ships deck. In some cases, replacing a blade necessitates that others of the blades be moved to an off balance position. That is, a brake system is activated to position the blade being replaced in a position that is horizontal to ground. In such a case, the others of the blades are off-balance imparting forces to the braking system. In other cases, the blade is placed in a position perpendicular to ground and lowered. In such cases, multiple crews are required to rotate the blade to prevent contact between the surface and a tip portion of the blade that may result in damage.

BRIEF DESCRIPTION OF THE INVENTION

According to one aspect of an exemplary embodiment, a method of replacing a wind turbine blade includes connecting a plurality of first hoisting devices between a wind turbine support hub and the wind turbine blade, suspending the wind turbine blade from the wind turbine support hub through the plurality of first hoisting devices, connecting a plurality of second hoisting devices between the wind turbine support hub and the wind turbine blade, supporting the wind turbine blade with the plurality of second hoisting devices, disconnecting the plurality of first hoisting devices from the wind turbine blade, and lowering the wind turbine blade to the ground.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
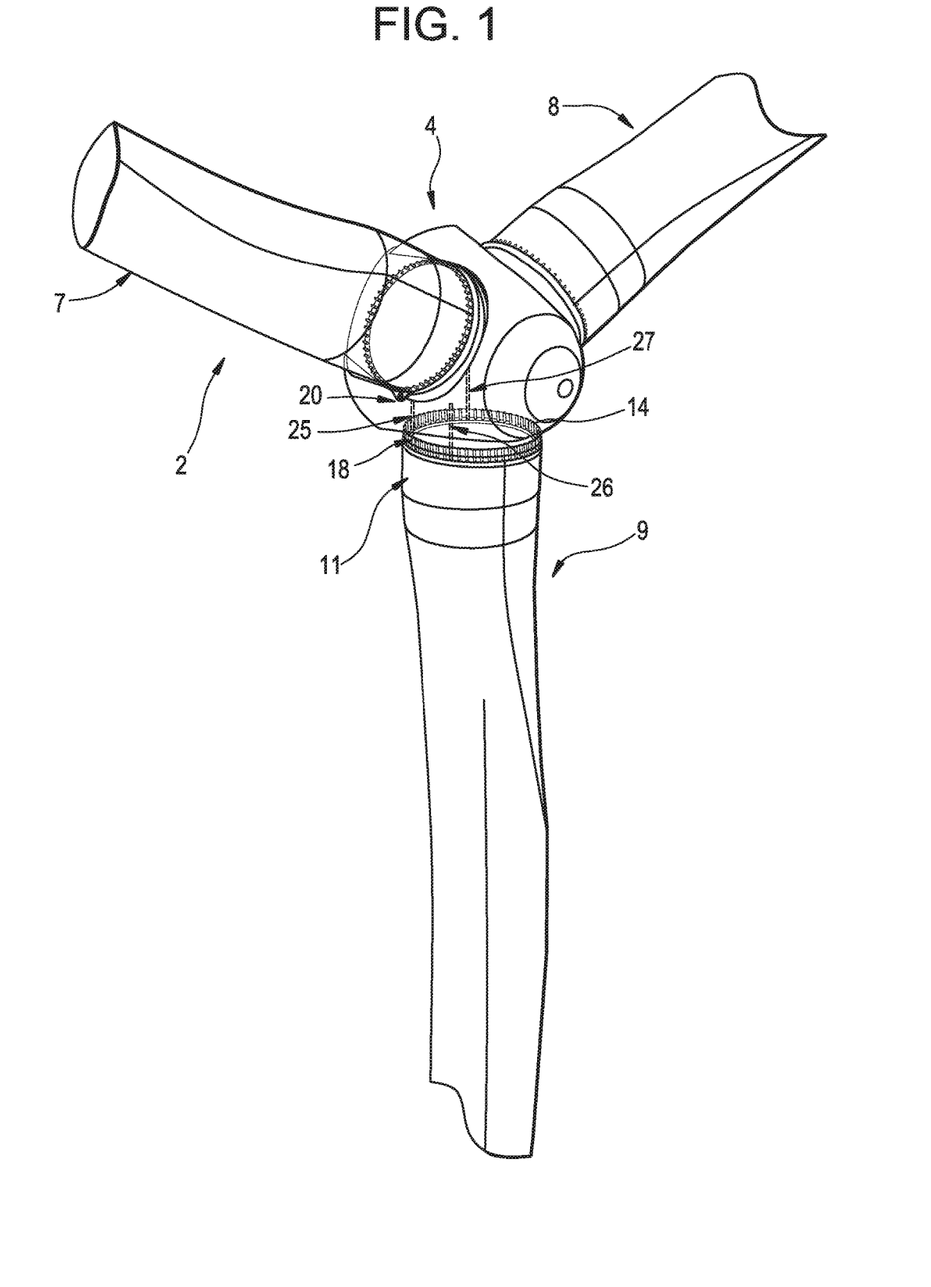
FIG. 1 is a partial perspective view of a wind turbine support hub having a system for effecting replacement of a single wind turbine blade in accordance with an exemplary embodiment.

A wind turbine is indicated generally at 2 in FIG. 1. Wind turbine 2 includes a support hub 4 having attached thereto a first wind turbine blade 7, a second wind turbine blade 8, and a third wind turbine blade 9. Third wind turbine blade 9 includes a first end or root portion 11 and a second end or tip portion 12. Of course, first and second wind turbine blades 7 and 8 also include first end or root portions (not separately labeled) as well as second end or tip portions (also not separately labeled). End portion 11 includes an array of mechanical fasteners, indicated generally at 14, that extend through a corresponding plurality of openings, one of which is shown at 16 (FIG. 3) provided on a blade receiving portion 18 of support hub 4. In accordance with an exemplary embodiment, a blade replacement system, a portion of which is indicated at 20, is provided within support hub 4.

Figure 2:
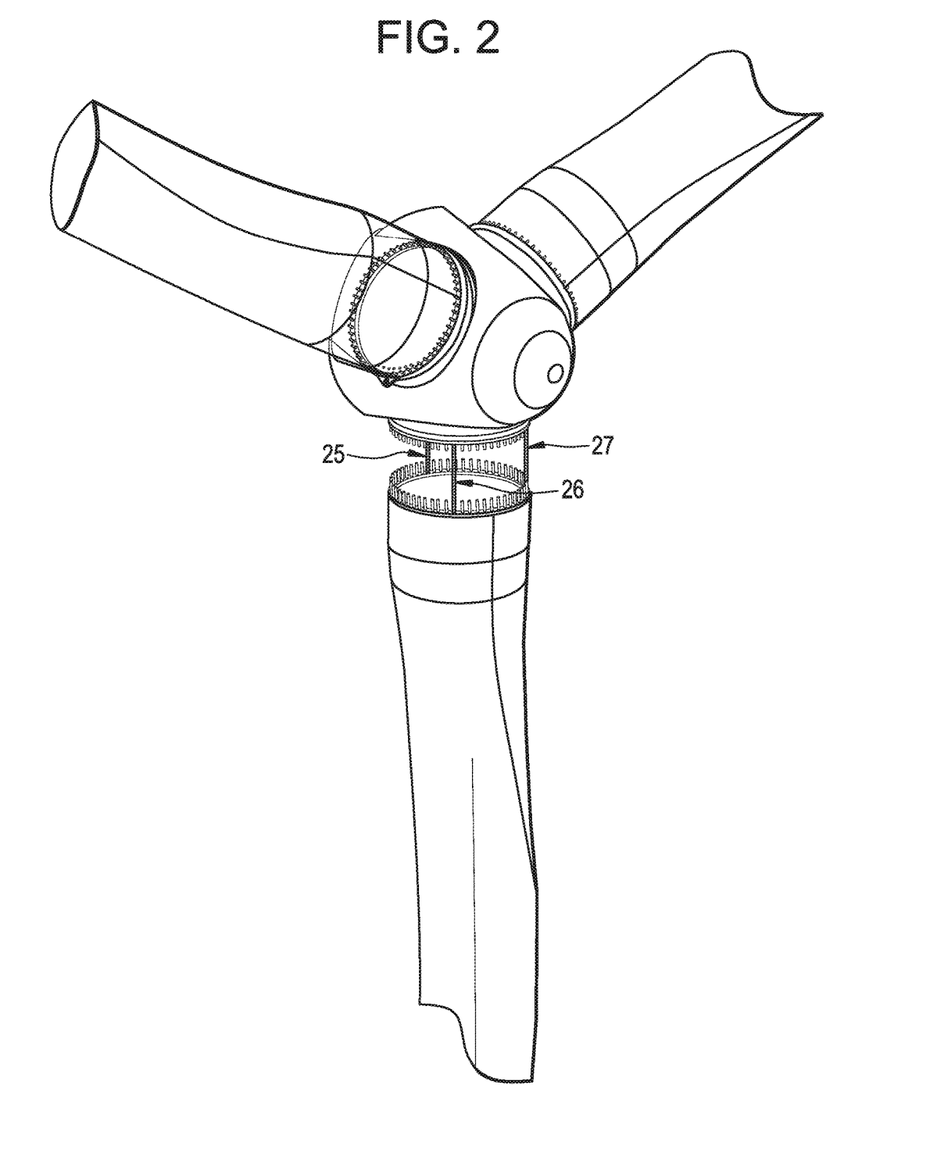
FIG. 2 is a partial perspective view a wind turbine blade of FIG. 1 suspended a first distance from the wind turbine support hub by a plurality of support members.
Figure 3:
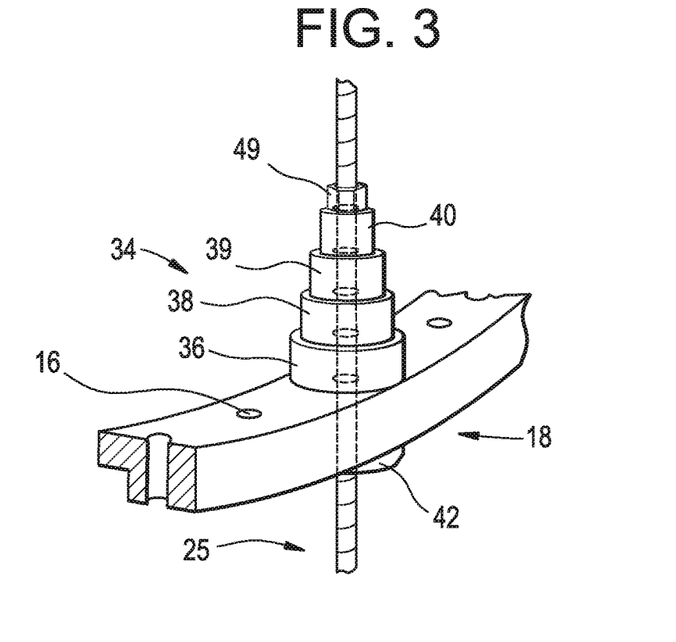
FIG. 3 depicts a support member and hydraulic jack cylinder in an extended configuration in accordance with an exemplary embodiment.

Blade replacement system 20 includes a first support member 25, a second support member 26, and a third support member 27. Support members 25-27 take the form of threaded rods (not separately labeled) that extend through openings 16 in blade receiving portion 18 and engage with threaded openings (not separately labeled) previously provided with fasteners 14 as shown in FIG. 2. Once installed, a hydraulic jacking cylinder 34, illustrated in FIG. 3, is guided over each support member 25-27. Hydraulic jacking cylinder 34 includes a base section 36 that rests on an inner surface (not separately labeled) of blade receiving portion 18 and a plurality of telescoping sections 38-40. Base section 36 and telescoping sections 38-40 include a central passage 42 that receives a corresponding one of support members 25-27.

Figure 4:
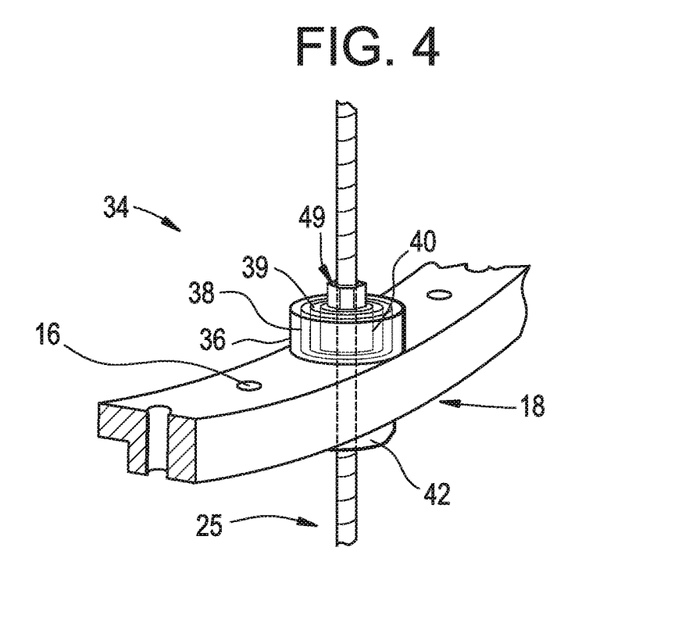
FIG. 4 depicts the hydraulic jack cylinder of FIG. 3 in a retracted configuration.

In FIG. 3, hydraulic jacking cylinder 34 is shown mounted over a free end (not separately labeled) of support member 25. Once in position, telescoping sections 38-40 are extended and a retaining nut 49 is threaded onto first support member 25. Once additional hydraulic jacking cylinders (not shown) are provided on first and second support members 26 and 27, retaining nuts 49 are removed from fasteners 14. At this point, telescoping sections 38-40 are shifted into base section 36 (FIG. 4) separating third wind turbine blade 9 from support hub 4 a first distance. Once separated the first distance, one at a time, retaining nuts 49 are moved away from base section 36 and telescoping sections 38-40 are again extended in preparation for further separation of third wind turbine blade 9 from support hub 4.

Figure 5:
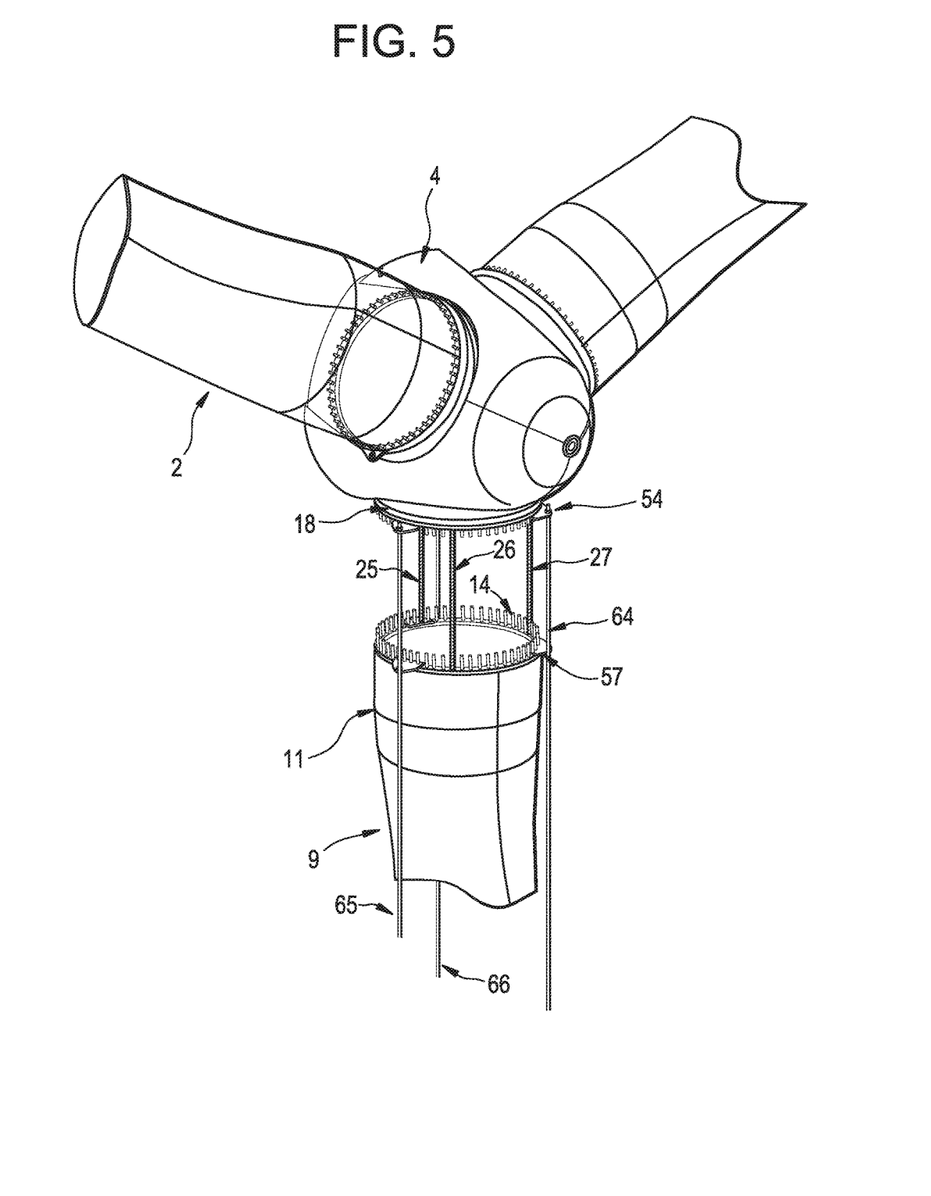
FIG. 5 is a partial perspective view of a plurality of bracket members secured to the wind turbine support hub and a plurality of bracket elements secured to the wind turbine blade.

Blade replacement system 20 also includes a plurality of bracket members, one of which is indicated at 54 and a plurality of bracket elements, one of which is indicated at 57. When separated the first distance, bracket members 54, are mounted to blade receiving portion 18 and bracket elements 57 are mounted to select ones of fasteners 14 on third wind turbine blade 9, as shown in FIG. 5. Each bracket member 54 and bracket element 57 includes mounting structure, shown in the form of openings (not separately labeled). A number of cables 64, 65, and 66, are connected to corresponding ones of bracket members 54. Specifically, one end (not separately labeled) of each cable 64, 65, and 66 is mounted to a corresponding bracket member 54 which another, free end of each cable 64, 65, and 66 is allowed to fall toward ground. By "ground" it should be understood that the free end of each cable 64, 65 and 66 may fall towards ground, a ship's deck, or a body of water depending upon the location of wind turbine 2. Once bracket members 54 and bracket elements 57 are installed, telescoping sections 38-40 of hydraulic jacking cylinders 34 are lowered creating further separation between third wind turbine blade 9 and support hub 4.

Figure 6:
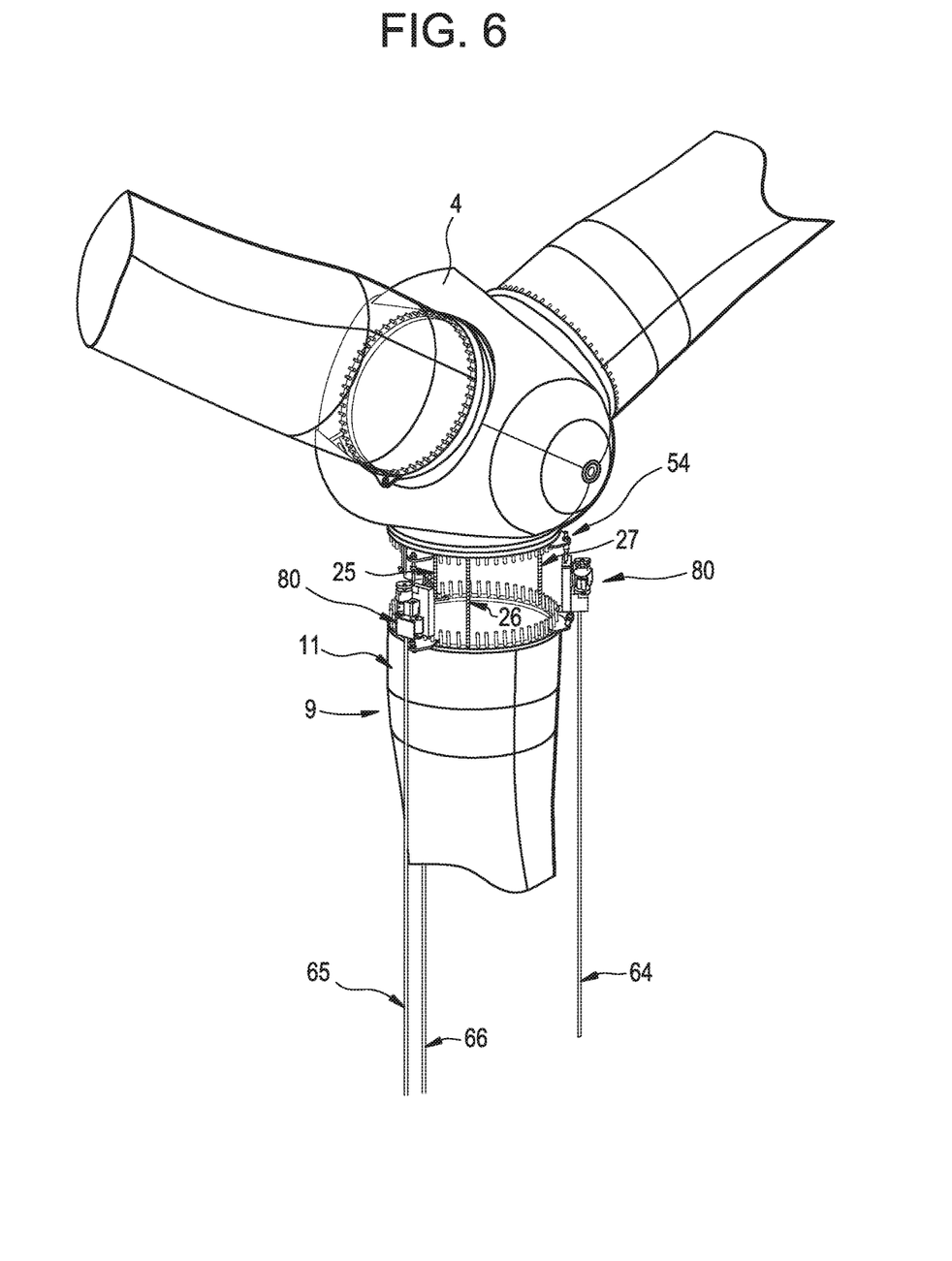
FIG. 6 depicts a plurality of cable climbing members and a plurality of support members supporting the wind turbine blade from the wind turbine support hub.
Figure 7:
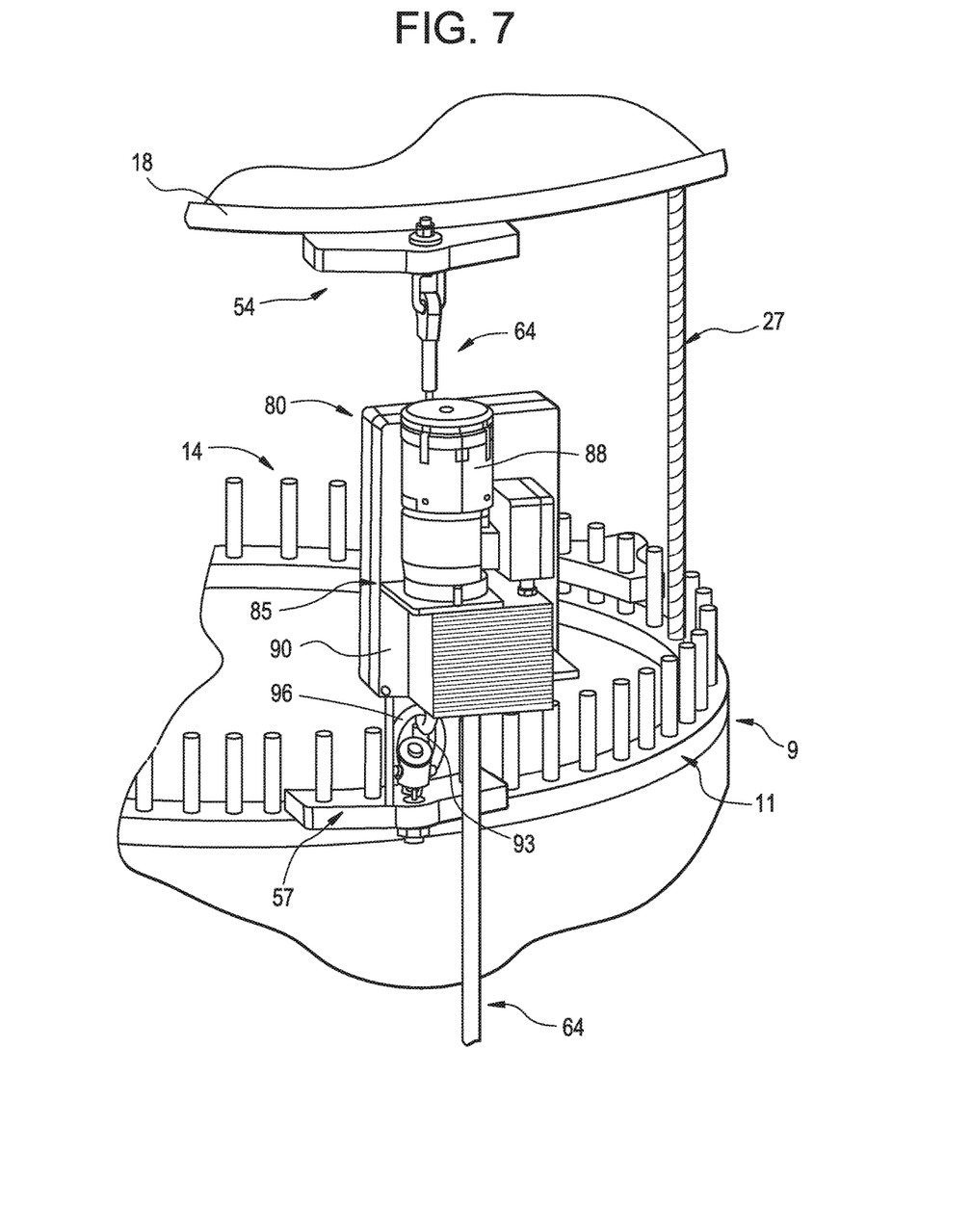
FIG. 7 depicts one of the plurality of cable climbing members supporting the wind turbine blade from the wind turbine support hub.
Figure 8:
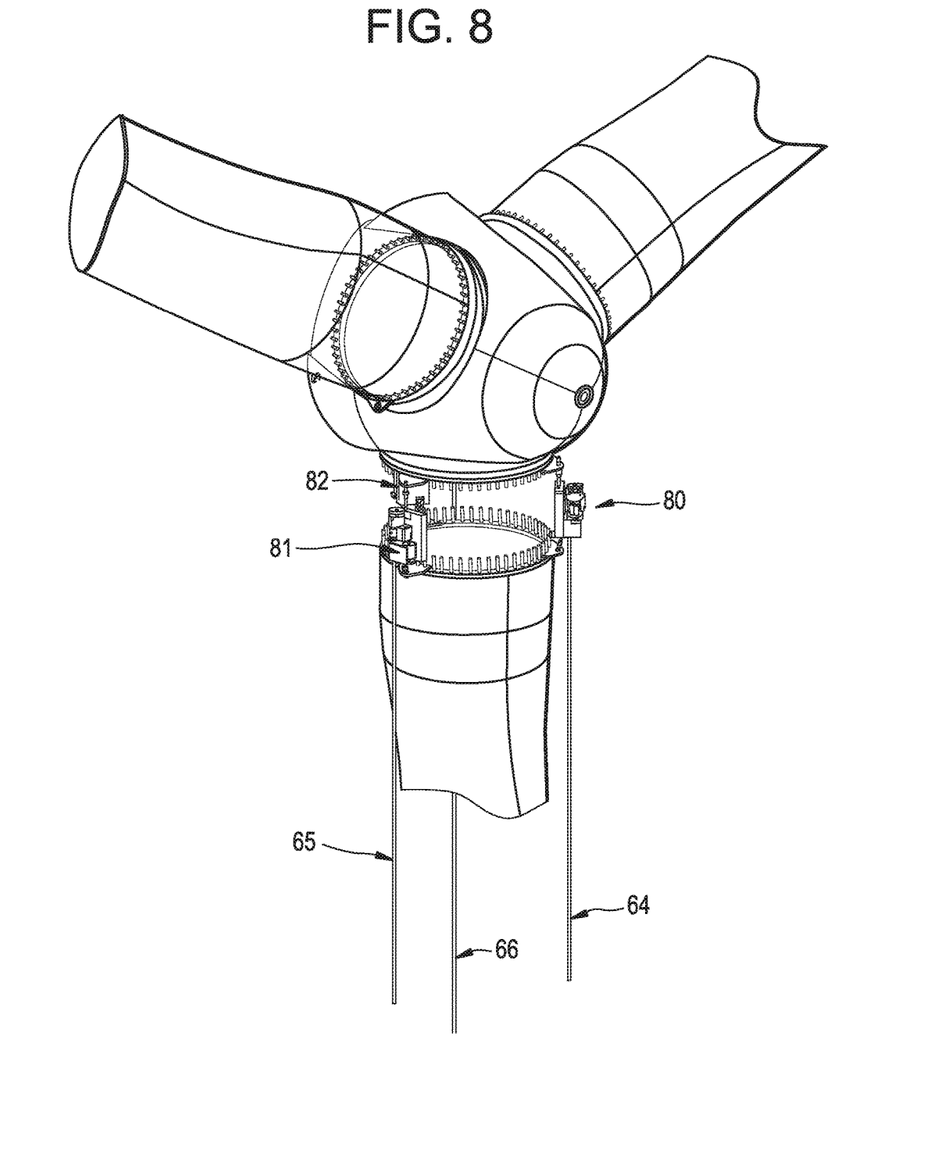
FIG. 8 depicts the wind turbine blade of FIG. 1, supported from the wind turbine support hub through only the plurality of cable climbing members.
Figure 9:
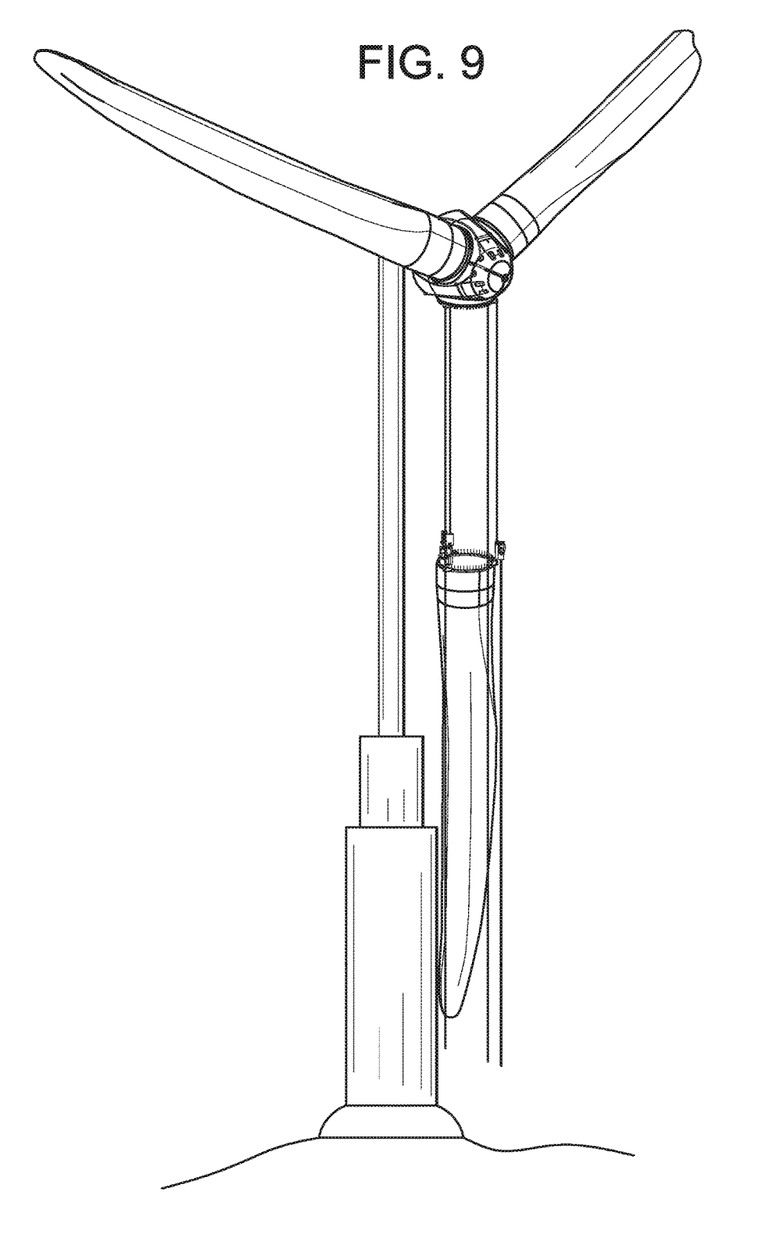
FIG. 9 depicts the wind turbine blade being lowered toward ground.
Figure 10:
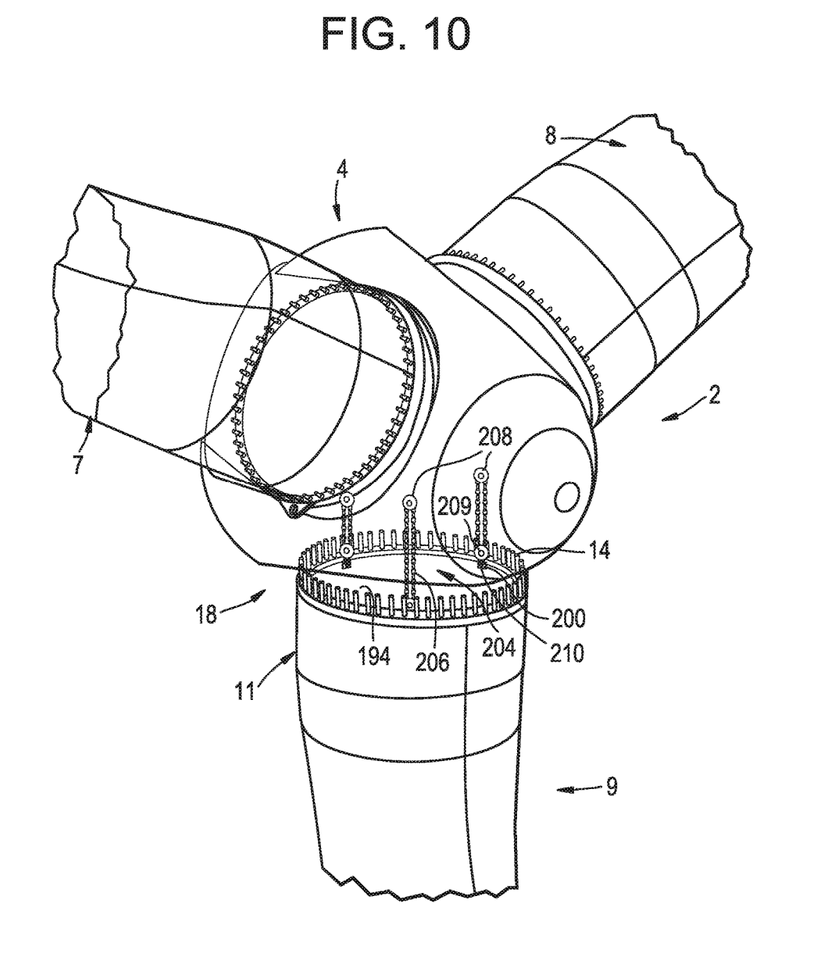
FIG. 10 is a partial perspective view of a wind turbine support hub having a system for effecting replacement of a single wind turbine blade in accordance with another exemplary embodiment

The additional separation allows for the mounting of cable climbing members. More specifically, blade replacement system 20 further includes a plurality of cable climbing members 80, 81, and 82. Cable climbing members are connected to corresponding ones of cables 64, 65, and 66. Cable climbing members 80, 81, and 82 are controlled so as to climb from the free ends of each cable 64-66 toward bracket members 54, as shown in FIG. 6. As each cable climbing member 80, 81, and 82 is similarly formed, a detailed description will follow to FIG. 7 in describing cable climbing member 80 with an understanding that cable climbing members 81 and 82 include corresponding structure. Cable climbing member 80 includes a housing 85 that supports a motor 88, a cable climbing portion 90 and a shackle 93. Shackle 93 is connected to bracket element 57 through a coupler 96. Once all cable climbing members 80-82 are connected to corresponding bracket elements 57, telescoping sections 38-40 of hydraulic jacking cylinders 34 are further lowered transferring support of third wind turbine blade 9 from support members 25-27 to cable climbing members 80-82 as shown in FIG. 8. At this point, support members 25-27 may be removed, and cable climbing members 80-82 shifted or climbed down cables 64-66 to lower third wind turbine blade 9 from support hub 4 as shown in FIG. 9. The above steps may be revised to raise and install a new wind turbine blade.

Reference will now follow to FIGS. 10-16, wherein like reference numbers represent corresponding parts in the respective views, in describing another exemplary embodiment of the present invention. Root portion 11 of wind turbine blade 9 includes an inner surface 194. A plurality of hook members, one of which is indicated at 200, is attached to inner surface 194 of root portion 11. Prior to lowering wind turbine blade 9 to the ground, a tip rigging bracket 201 (FIG. 15) is secured to adjacent to tip portion 12. A ground based tip rigging line or tether 202 may be secured or connected to tip rigging bracket 201. As will be detailed more fully below, tether 202 allows personnel to shift tip portion as wind turbine blade 9 is lowered to the ground.

Figure 11:
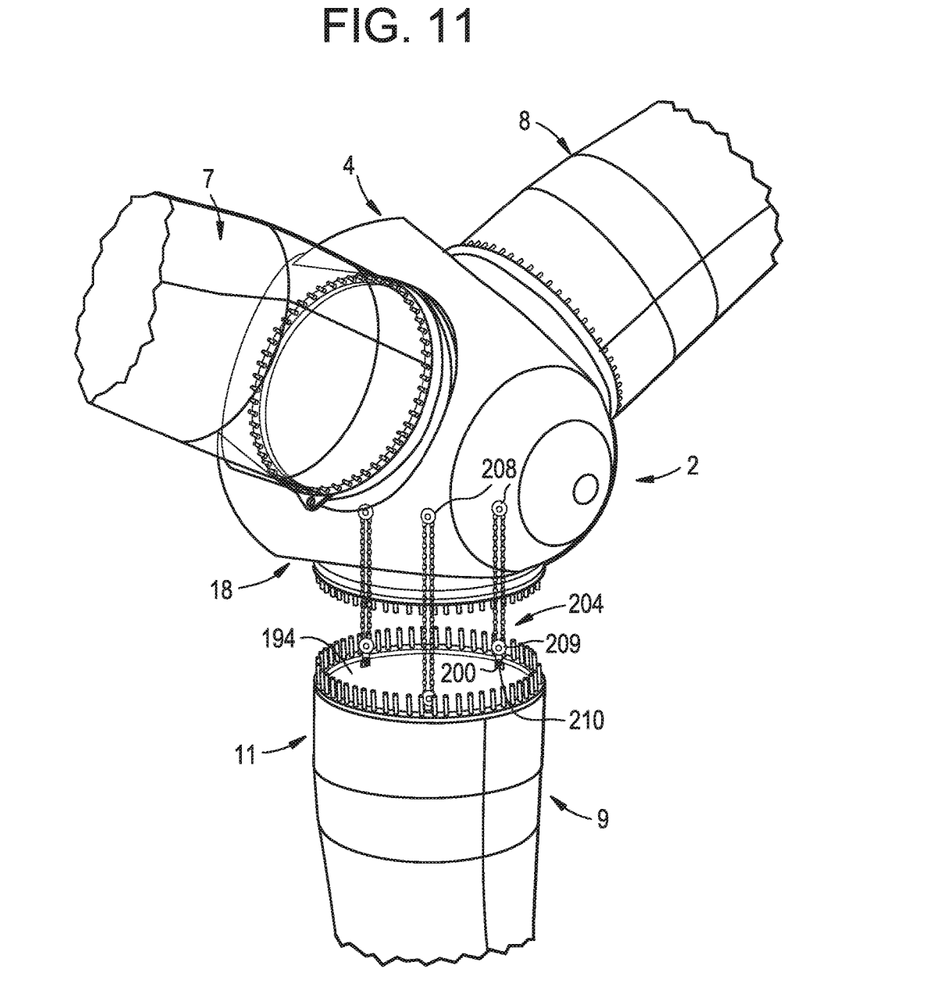
FIG. 11 is a partial perspective view the wind turbine blade of FIG. 10 suspended a first distance from the wind turbine support hub by plurality of first hoisting devices in accordance with an aspect of an exemplary embodiment.

A plurality of first hoisting devices, one of which is indicated at 204, is secured between support hub 4 and wind turbine blade 9. Each of the plurality of first hoisting devices 204 may take the form of a chain hoist 206 having a first end 208 supported in support hub 4 and a second end 209 including a shackle 210 that is coupled to hook member 200. One or more chains (not separately labeled) may extend between first and second ends 208 and 209. Once connected, wind turbine blade 9 may be disconnected from blade receiving portion 18. After freeing array of mechanical fasteners 14, wind turbine blade 9 may be lowered a first distance from wind turbine support hub 4 by plurality of first hoisting devices 204, as shown in FIG. 11.

Figure 12:
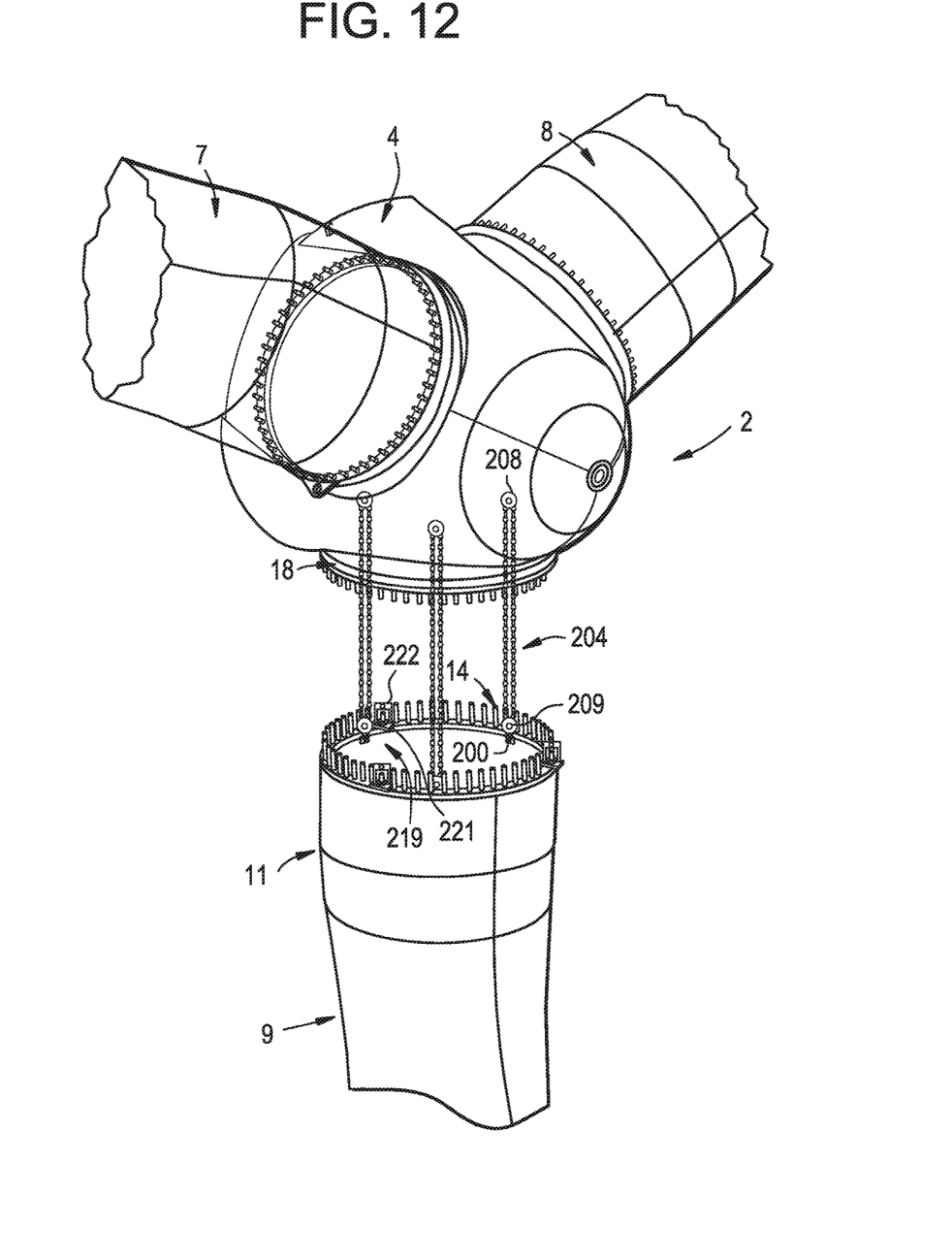
FIG. 12 is a partial perspective view of the wind turbine blade of FIG. 11 depicting attachment of a plurality of hook elements, in accordance with an aspect of an exemplary embodiment.
Figure 13:
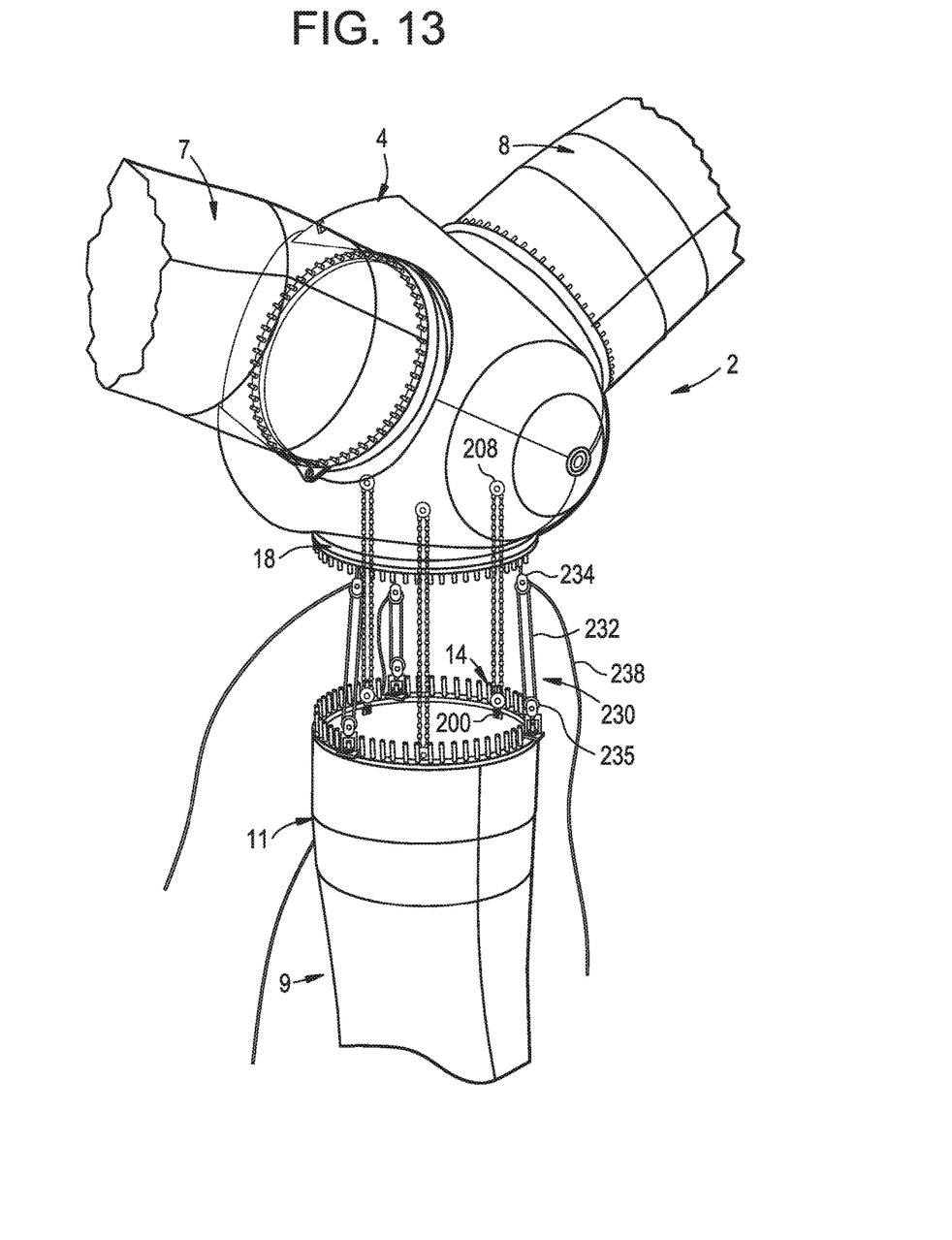
FIG. 13 is a partial perspective view of the wind turbine blade of FIG. 12 suspended from the wind turbine support hub through the plurality of first hoisting devices and a plurality of second hoisting devices.

A plurality of hook elements, one of which is indicated at 219, may be secured to array of mechanical fasteners 14, as shown in FIG. 12. Each hook element 219 includes a base portion 221 and a hook eye portion 222. Base portion 221 may include one or more passages (not separately labeled) receptive to a corresponding one of array of mechanical fasteners 14. After connecting hook elements 219 to root portion 11, a plurality of second hoisting devices, one of which is indicated at 230, is connected between wind turbine support hub 4 and wind turbine blade 9, as shown in FIG. 13. Each of the plurality of second hoisting devices 230 may take the form of a block and tackle 232 that may be lifted up to personnel in wind turbine support hub 4. Each block and tackle 232 includes a first end portion 234 fixedly supported within wind turbine support hub 4 and a second end portion 235 coupled to hook eye portion 222. A cable or rope 238 is threaded through pulleys (not separately labeled) carried by first and second end portions 234 and 235. Rope 238 includes a tag end 240 that extends to the ground.

Figure 14:
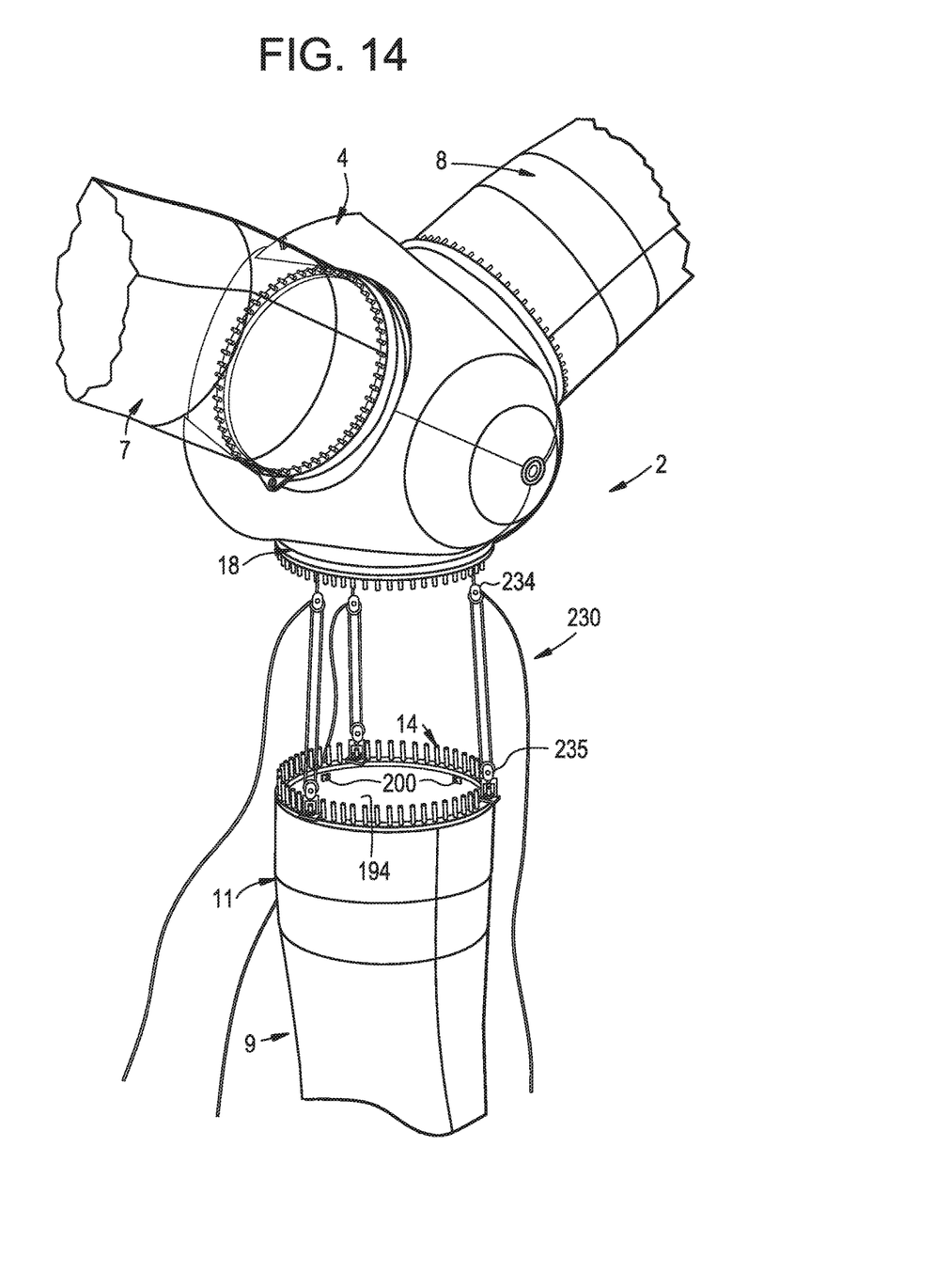
FIG. 14 is a partial perspective view of the wind turbine blade of FIG. 13 supported from the wind turbine support hub by the plurality of second hoisting devices following completion of a handshake maneuver.
Figure 15:
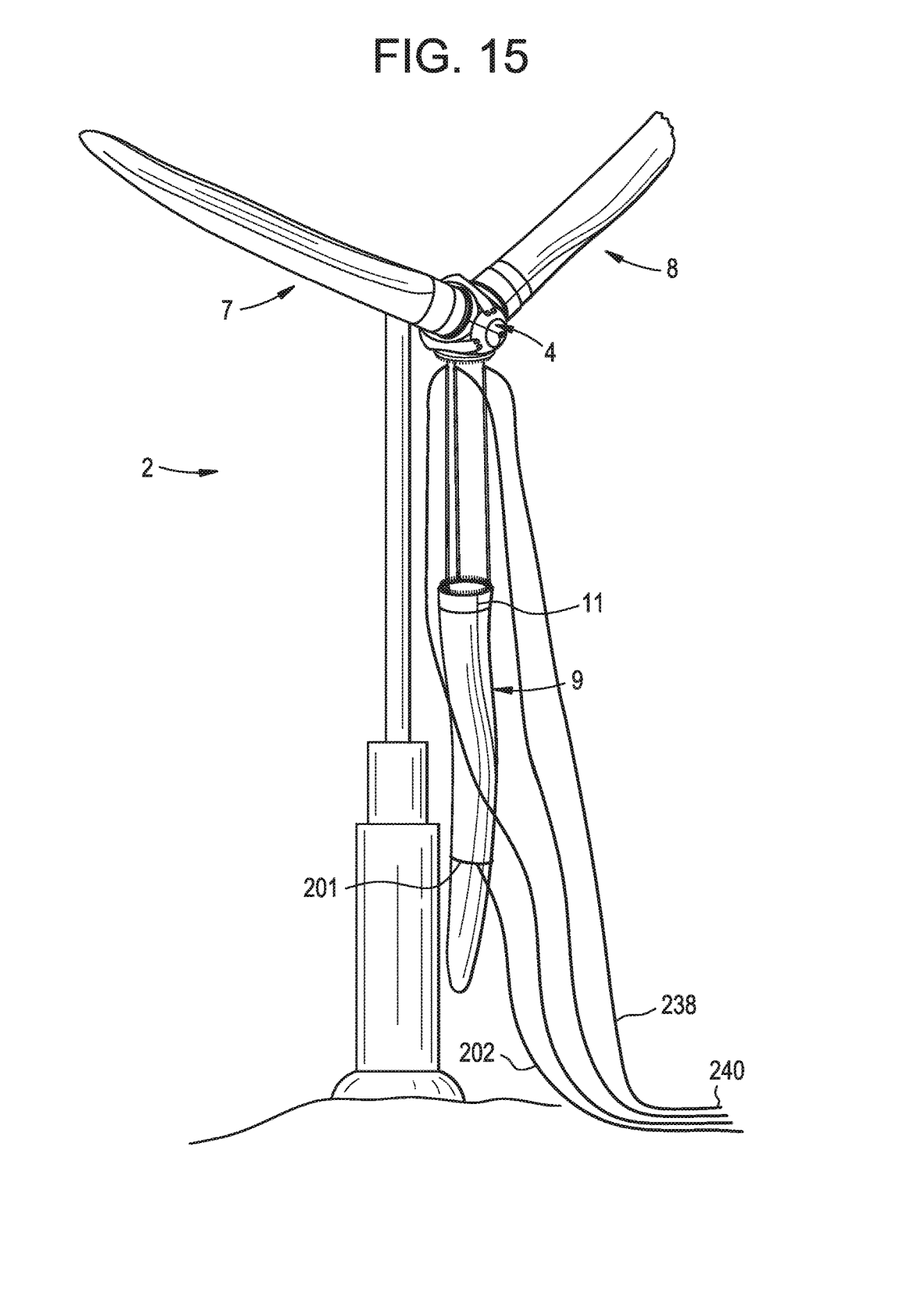
FIG. 15 depicts the wind turbine blade of FIG. 14 being lowered from the wind turbine support hub without the use of a crane by the plurality of second lifting members.
Figure 16:
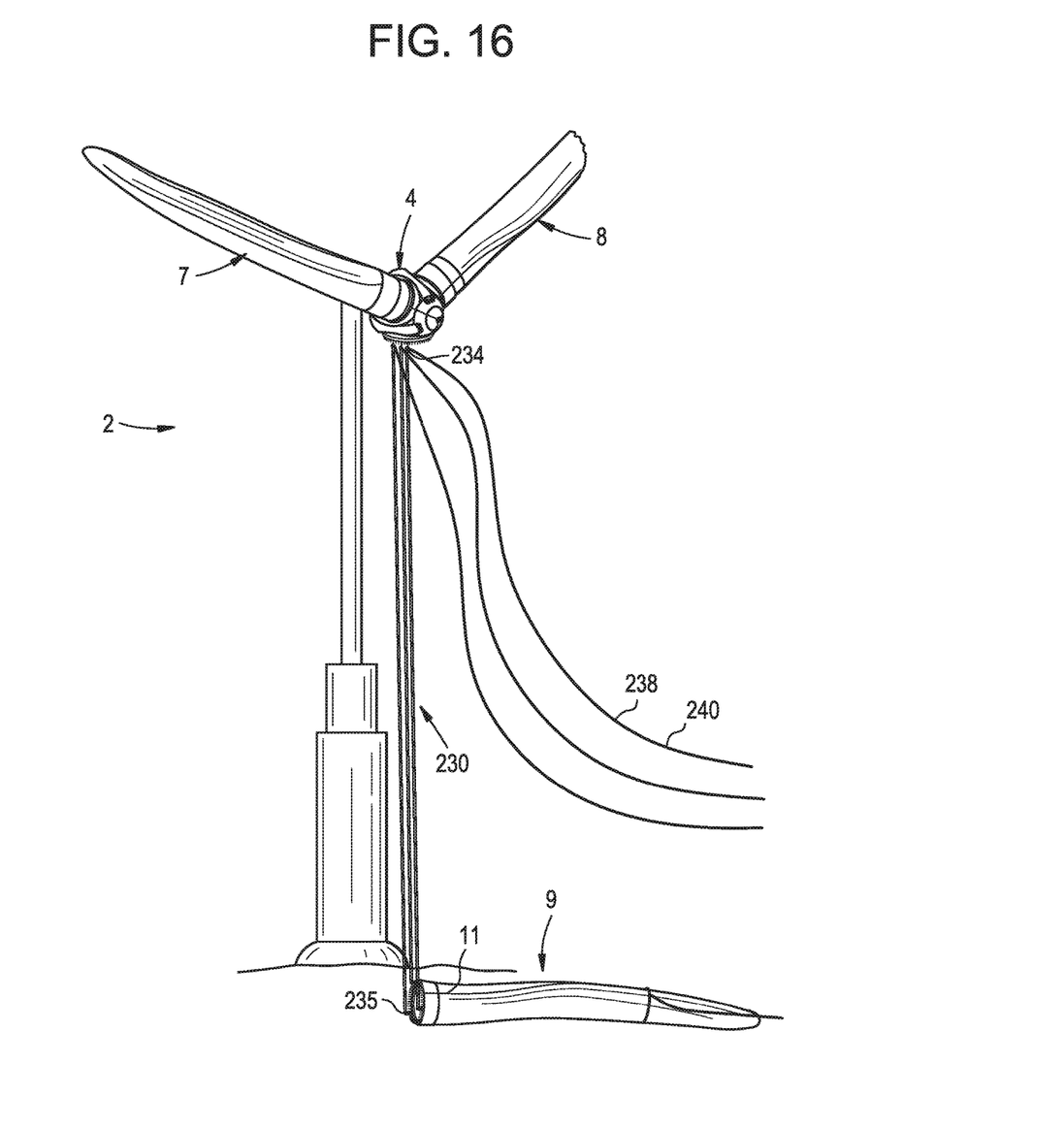
FIG. 16 depicts the wind turbine blade of FIG. 15 resting on the ground.

A handshake maneuver is performed after attaching the plurality of second hoisting devices 230. During the handshake maneuver, the plurality of first hoisting devices 204 are operated such that wind turbine blade 9 is supported by the plurality of second hoisting devices 230. Once wind turbine blade 9 is supported by the plurality of second hoisting devices 230, the plurality of first hoisting devices 204 may be disconnected and removed, such as shown in FIG. 14. The plurality of second hoisting devices 230 may be operated to lower wind turbine blade 9 toward the ground, as shown in FIG. 15. While lowering, tension may be applied to tether 202 to gradually move wind turbine blade 9 from a generally vertical orientation to a generally horizontal position. Wind turbine blade 9 may then be landed, as shown in FIG. 16. Tension in tether 202 may be applied through ground based winches or by a small mobile crane.

At this point it should be understood that the exemplary embodiments describe a system for lowering and raising wind turbine blades without the need for ground-based cranes. The exemplary embodiments employ multiple hoisting devices that are used to lower the wind turbine blade to the ground without the need for large, ground based cranes. It should also be understood that the number and type of hoisting devices may vary. Further, it should be understood that a new blade can be raised and secured to the hub by reversing the process described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of replacing a wind turbine blade comprising:
    connecting a plurality of first hoisting devices between a wind turbine support hub and the wind turbine blade, each of the first hoisting devices having a member connected at one end to the wind turbine blade and an opposite end to a discrete location on the wind turbine support hub, the discrete locations of the first hoisting devices spaced circumferentially around the wind turbine support hub;
    suspending the wind turbine blade from the wind turbine support hub through the plurality of first hoisting devices;
    connecting a plurality of second hoisting devices separate from the first hoisting devices between the wind turbine support hub and the wind turbine blade, each of the second hoisting devices having a cable with a first end connected to the wind turbine support hub and an opposite free end that hangs to ground, the second hoisting devices spaced circumferentially around the wind turbine support hub;
    supporting the wind turbine blade with the plurality of second hoisting devices;
    disconnecting the plurality of first hoisting devices from the wind turbine blade; and
    lowering the wind turbine blade to the ground with the cables of the second hoisting devices.

2. The method of claim 1, wherein suspending the wind turbine blade includes lowering the wind turbine blade from the wind turbine support hub through the plurality of first hoisting devices.

3. The method of claim 1, wherein connecting the plurality of first hoisting devices includes coupling a hook member of each of the plurality of first hoisting devices to a corresponding hook member secured to an inner annular surface of the wind turbine blade.

4. The method of claim 1, wherein disconnecting the plurality of first hoisting devices includes performing a handshake maneuver transferring support of the wind turbine blade from the plurality of first hoisting devices to the plurality of second hoisting devices.

5. The method of claim 1, wherein connecting the plurality of first hoisting devices to the wind turbine blade includes coupling one of a rigid structural member or a chain hoist at each first hoisting device serving as the member between the wind turbine support hub and the wind turbine blade.

6. The method of claim 1, wherein connecting the plurality of second hoisting devices includes coupling a block and tackle device at each second hoisting device between the wind turbine support hub and the wind turbine blade.

7. The method of claim 1, wherein the lowering of the wind turbine blade to the ground along the cables of the second hoisting devices includes providing a cable climbing member on each cable, connecting each cable climbing member to the wind turbine blade, and advancing the cable climbing members down the cables to lower the wind turbine blade.

8. The method of claim 1, wherein connecting the plurality of second hoisting devices includes coupling each of the plurality of second hoisting devices to a corresponding hook element mounted to a root end portion of the wind turbine blade.

9. The method of claim 8, wherein coupling each of the plurality of second hoisting devices includes mounting the hook element to one or more of an array of mechanical fasteners extending from a root end portion of the wind turbine blade.

10. The method of claim 1, further comprising:
    securing a tip rigging bracket to the wind turbine blade; and
    connecting a ground based tip rigging line to the tip rigging bracket.

11. The method of claim 10, further comprising: shifting a tip portion of the wind turbine blade away from a wind turbine support tower as the wind turbine blade is lowered through the plurality of second hoisting devices.

* * * * *